United States Patent
Yamaguchi

(10) Patent No.: US 7,012,715 B2
(45) Date of Patent: Mar. 14, 2006

(54) IMAGE PROCESSING APPARATUS

(75) Inventor: Hiroshi Yamaguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 121 days.

(21) Appl. No.: 10/816,956

(22) Filed: Apr. 5, 2004

(65) Prior Publication Data

US 2004/0190061 A1  Sep. 30, 2004

Related U.S. Application Data

(62) Division of application No. 09/556,513, filed on Apr. 21, 2000, now Pat. No. 6,937,363.

(30) Foreign Application Priority Data

Apr. 22, 1999 (JP) .................................. 11-114582

(51) Int. Cl.
H04N 1/21 (2006.01)
H04N 1/40 (2006.01)
H04N 1/48 (2006.01)
H04N 1/64 (2006.01)

(52) U.S. Cl. ....................... 358/1.9; 358/1.16; 358/524; 358/404

(58) Field of Classification Search ................. 358/1.9, 358/1.16, 1.17, 524, 527, 404, 444, 3.26–3.27; 348/231.1, 231.2, 231.3, 231.5, 231.6, 231.99
See application file for complete search history.

(56) References Cited

U.S. PATENT DOCUMENTS 5,581,311 A * 12/1996 Kuroiwa .................... 348/231.2
5,774,434 A *  6/1998 Arataki et al. ............. 369/53.24
6,243,108 B1 *  6/2001 Takiyama et al. ....... 348/231.99
6,832,275 B1 * 12/2004 Aizawa ................... 348/231.99
2004/0201737 A1 * 10/2004 Baron et al. ............. 348/231.2

FOREIGN PATENT DOCUMENTS

JP  2000-101833 B1  4/2000
JP  2000-222437 B1  8/2000

* cited by examiner

Primary Examiner—Scott A. Rogers
(74) Attorney, Agent, or Firm—Sughrue Mion, PLLC

(57) ABSTRACT

There is provided an image processing apparatus including an image processing unit for performing image processing on an input image to produce an output image; a storing unit for storing image-related information relating to at least one image processed by the image processing unit; a search unit for searching the storing unit in response to an instruction for reprocessing the input image and reading the image-related information previously stored in the storing unit; and a display unit for representing a result of a search performed by the search unit. The image processing unit performs reprocessing of the input image in accordance with the image-related information that the search unit read in response to the instruction for reprocessing the input image. A reprint, on which an image whose color and density are preferably in agreement with those of the image reproduced on a simultaneous print is reproduced, can be stably output with a simple manipulation.

3 Claims, 3 Drawing Sheets

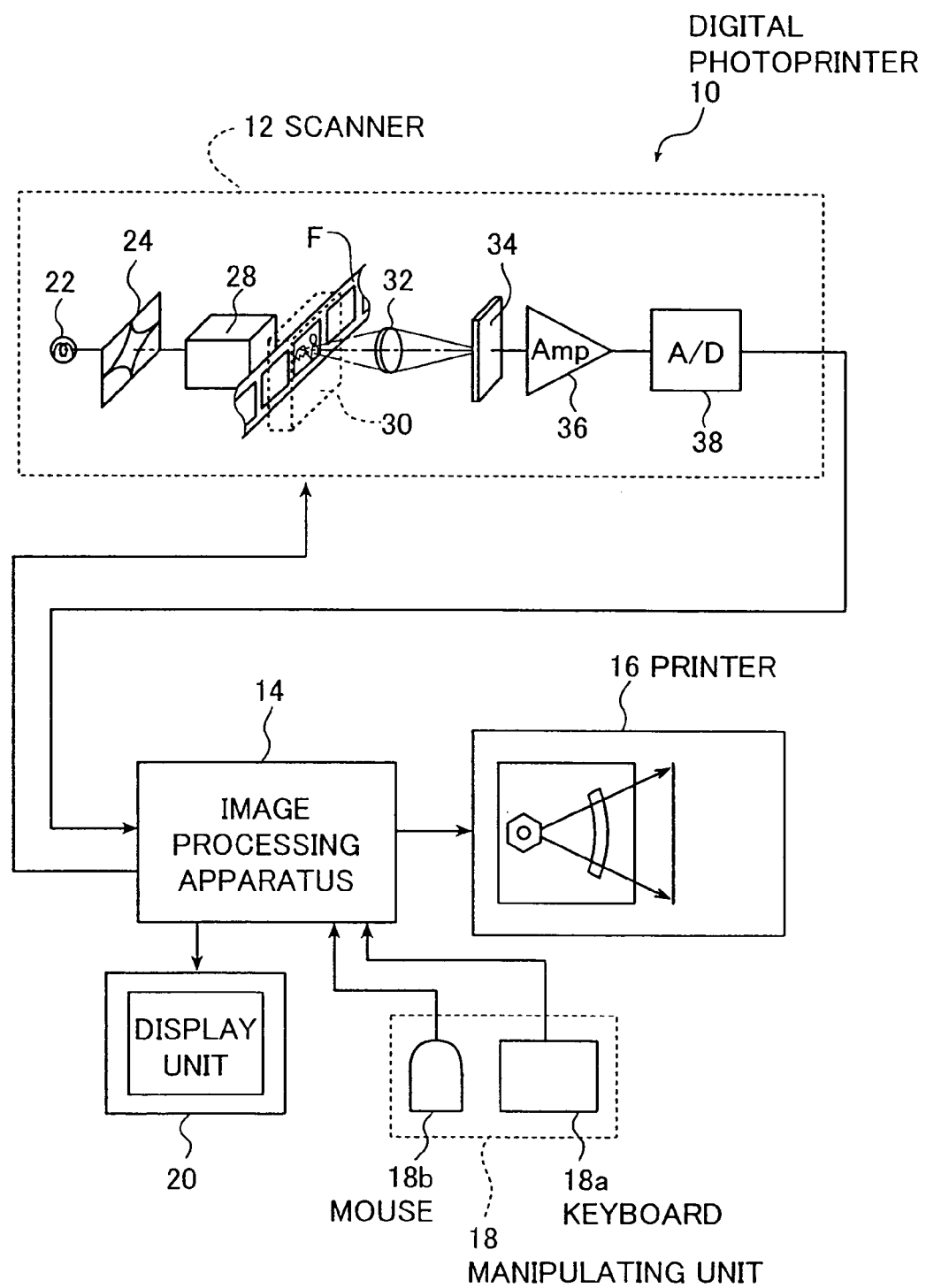

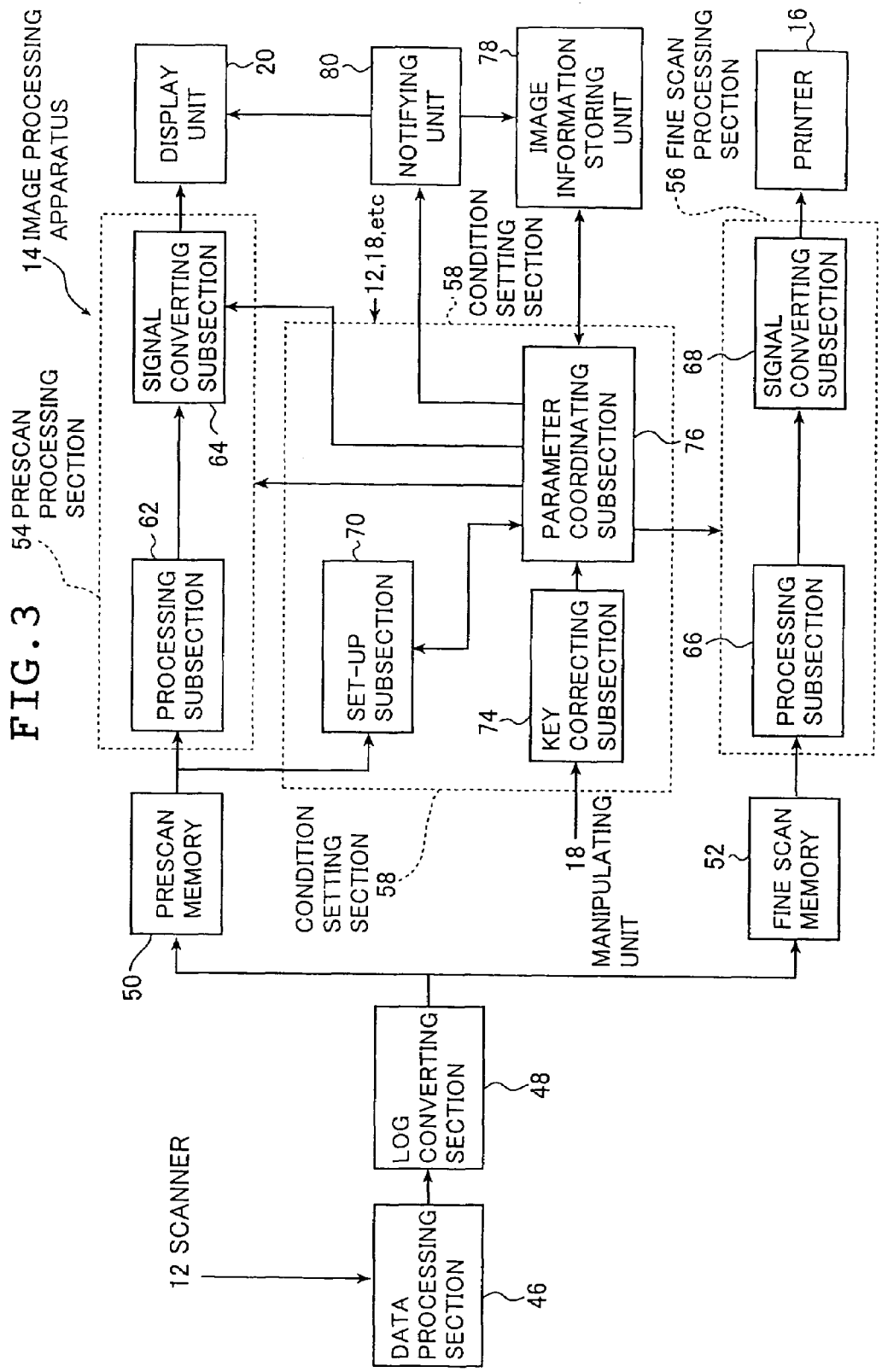

IMAGE PROCESSING APPARATUS

This is a divisional of application Ser. No. 09/556,513 filed Apr. 21, 2000; now U.S. Pat. No. 6,937,363 the disclosure of which is incorporated herein by reference.

BACKGROUND OF THE INVENTION

The present invention relates to the technical field of a print system for outputting a print (photograph) on which an image recorded on a film or an image recorded by a digital camera is reproduced. More specifically, the present invention relates to an image processing apparatus capable of making an output image from the previous processing of an input image or an output image on a simultaneous print advantageously coincident with an output image obtained by reprocessing thereof or an output image on a reprint, in the print system.

At present, most of images recorded on photographic films such as negative and reversal films (which are hereinafter referred to as "films") are printed onto light sensitive materials (photographic papers) by a technique generally called "direct exposure" in which the light-sensitive materials are exposed with the light projected from the films.

In contrast, printers that adopt digital exposure have recently been commercialized. In this "digital photoprinter", the image recorded on a film is read photoelectrically and converted into digital signals, which are subjected to various kinds of image processing to produce image data for recording purposes, a light sensitive material is scanned and exposed with recording light modulated in accordance with the image data, thereby recording a (latent) image which is then developed to produce a (finished) print.

The digital photoprinter comprises basically a scanner (image reading apparatus) for allowing reading light to be incident on a film and reading light projected therefrom to thereby photoelectrically capture the image recorded on the film; an image processing apparatus for subjecting the image data read by the scanner or the image data sent from a digital camera or the like to predetermined processing, thereby obtaining image data for image recording, that is, setting exposure conditions; a printer (image recording apparatus) for recording a latent image by scanning and exposing a light-sensitive material with, for example, a light beam in accordance with the image data output from the image processing apparatus; and a processor (development apparatus) for subjecting the light-sensitive material having been exposed with the printer to development processing and for outputting (finished) prints on which the images are reproduced.

In the digital photoprinter, since images can be adjusted by image data processing using digitized image data, prints of high quality, which cannot be obtained by the conventional direct exposure, can be obtained by effectively executing the correction of dropouts and blocked-ups due to photography with rear light or an electronic flash, sharpening processing and the like.

Further, in the digital photoprinter, the images recorded by a digital camera and the like also can be output as prints.

Incidentally, as to images recorded on a film and image data recorded by a digital camera and output as prints, there are often made so-called reprints, on which images (frames) having been printed once are printed again and output, in response to the request of a customer for extra printing, not only in the digital photoprinter but also in other printers.

In this case, unless correction is particularly instructed, it is required that the image of a print output previously (ordinarily, a print which is output in simultaneous printing) is in agreement with the image reproduced on a reprint. However, the color and the density of the image of a reprint is often different from those of the image of a previous print because an operator makes a different judgement or operation, about which a complaint is often made from customers.

SUMMARY OF THE INVENTION

An object of the present invention is to solve the problem of the conventional art and to provide an image processing apparatus capable of stably reproducing an image whose color and density are similar to those of a simultaneous print or a previous print when a reprint is made in response to the request for extra prints and the like, in a print system for outputting prints on which images recorded on a photographic film or images recorded by a digital camera and the like are reproduced.

To achieve the above object, the present invention provides an image processing apparatus, comprising: an image processing unit for performing image processing on an input image to produce an output image; a storing unit for respectively storing image-related information relating to at least one image processed by the image processing unit; a search unit for searching the storing unit in response to an instruction for reprocessing the input image and reading the image-related information previously stored in the storing unit; and a display unit for displaying a result of a search performed by the search unit, wherein the image processing unit performs reprocessing of the input image in accordance with the image-related information that the search unit read in response to the instruction for reprocessing the input image.

The phrase "reprocessing of the input image" as used in the present invention generally refers to reproducing again as a print image or reprinting an image obtained by recording a subject on a photographic film and having been reproduced as a print image upon development, or an image directly obtained by recording a subject with a digital camera and also having been reproduced as a print image upon recording, that is, after simultaneous printing is carried out. In the present invention however, this phrase also includes the case where prints are created again after reprinting is once or several times performed, which is also referred to as "reprinting".

Further in the present invention, reproduction method of an image recorded on a photographic film or an image recorded with a digital camera as a print image may be of digital print type or analog print type. The former type obtains a reproduced image by exposing a light-sensitive material (so-called photographic paper) based on digital image data read from a photographic film with a scanner or digital image data directly obtained from a digital camera or the like, and developing the thus exposed material, whereas the latter type obtains a reproduced image by direct exposure of a light-sensitive material (photographic paper) with an image of a photographic film and subsequent development.

The reprocessing of the input image includes preferably reprinting of the input image from a photographic film or the input image taken with a digital camera which has been previously printed.

The image-related information includes preferably search information for specifying the input image and contents of the image processing performed by the image processing unit.

Preferably, the image-related information includes an image representing the input image as the search information for specifying the input image, the result of the search represented on the display unit is the image representing the input image, and the display unit represents the result of the search together with the output image obtained by reprocessing the input image.

Preferably, the image processing apparatus further includes an instruction unit for instructing that the result of the search performed by the search unit is proper or improper, and when the instruction unit instructs that the result of the search is proper, the image processing unit performs the image processing using the image-related information read by the search unit, whereas, when the instruction unit instructs that the result of the search is improper, the image processing unit performs the image processing using the input image obtained in the reprocessing.

Preferably, the display unit represents a plurality of candidate images as the result of the search performed by the search unit and the instruction unit can select one of the plurality of candidate images.

According to another embodiment of the present invention, there is also provided an image processing apparatus, comprising: an image processing unit for performing image processing on an input image to produce an output image; a storing unit for respectively storing image-related information relating to at least one image processed by the image processing unit; a notification unit for notifying that the storing unit does not have a sufficient capacity to store the image-related information, when the image-related information has such an amount as to exceed the capacity of the storing unit; a modification unit for performing, in response to a notification made by the notification unit to inform that the storing unit does not have a sufficient capacity to store the image-related information, at least one of deleting the image-related information stored in the storing unit from older one, moving the image-related information to another storing device from older one, and selecting the image-related information to be deleted.

Preferably, the storing unit has a processing region for storing the image-related information relating to a predetermined unit of images having been previously set and a storing region for storing the image-related information of an image which is processed prior to an image whose image-related information is stored in the processing region and the image-related information stored in the processing region is transferred to the storing region after the image processing of the predetermined unit of the images is finished; the notification unit notifies that the storing region of the storing unit does not have a sufficient capacity to store the image-related information, when the image-related information has such an amount as to exceed the capacity of the storing region; and the modification unit performs, in response to a notification made by the notification unit to inform that the storing region of the storing unit does not have a sufficient capacity to store the image-related information, at least one of deleting the image-related information stored in the storing region from older one, moving the image-related information to another storing device, and selecting the image-related information to be deleted.

Preferably, the predetermined unit is a unit in terms of time or data volume.

BRIEF DESCRIPTION OF THE DRAWINGS

FIG. 1 is a block diagram of an embodiment of a digital photoprinter making use of an image processing apparatus of the present invention;

FIG. 3 is a block diagram of an embodiment of the image processing apparatus in the digital photoprinter shown in FIG. 1.

DETAILED DESCRIPTION OF THE INVENTION

Figure 2A:
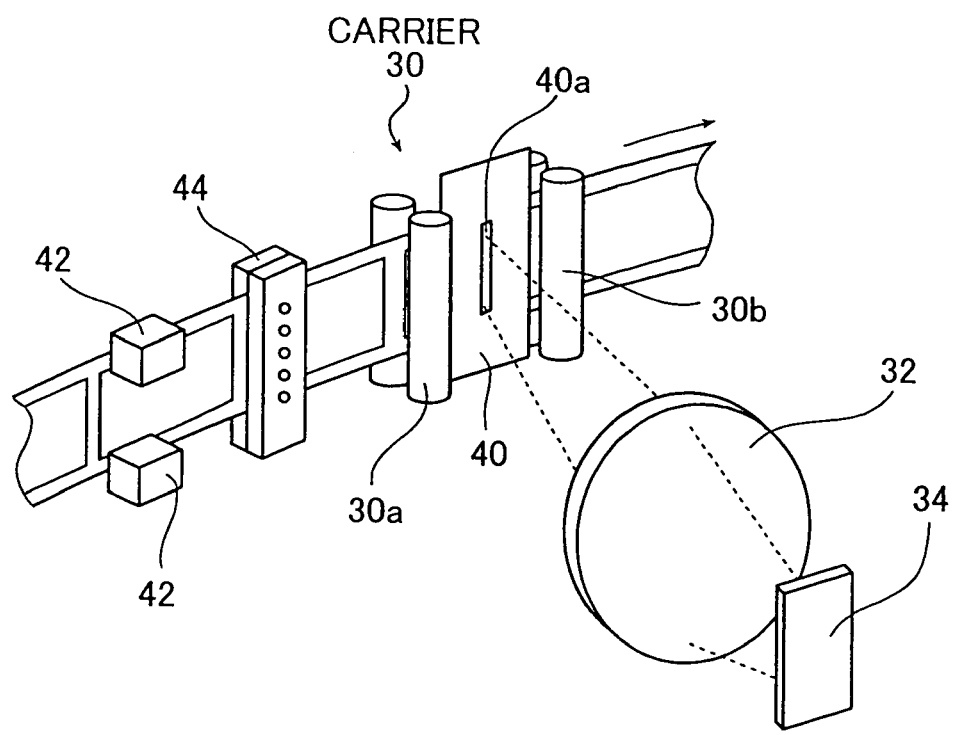
FIG. 2A shows a conceptual view of a scanner mounted on the digital photoprinter shown in FIG. 1.

The image processing apparatus of the present invention will be described below in detail with reference to preferable embodiments shown in the accompanying drawings.

FIG. 1 shows a block diagram of an exemplary digital photoprinter making use of the image processing apparatus of the present invention.

Note that the image processing apparatus of the present invention can be preferably used not only in the digital photoprinter but also in a conventional direct exposure type photoprinter (analog photoprinter) which prints images on a photographic paper with light projected from a film.

That is, images to be processed by the image processing apparatus of the present invention may be various kinds of image data obtained by photoelectrically reading images (including recorded scenes) or original images recorded on a film or the like (light projected or reflected therefrom).

The digital photoprinter generally indicated by 10 in FIG. 1 (hereinafter simply referred to as the "photoprinter 10") basically comprises a scanner (image reading apparatus) 12 which reads the image recorded on a film F photoelectrically; an image processing apparatus 14 which performs image processing of the thus read image data (image information) to produce output image data, and which allows the manipulation, control and otherwise of the photoprinter 10 in its entirety; and a printer 16 which exposes a light-sensitive material (photograph paper) imagewise with optical beams modulated in accordance with the image data sent from the image processing apparatus 14, develops the exposed material and outputs it as a (finished) print.

Connected to the image processing apparatus 14 are a manipulating unit 18 having a keyboard 18a and a mouse 18b to enter (set) various conditions, to select and issue a command for a specific processing step and to enter commands for color/density correction and the like, as well as a display unit 20 which displays, the image read with the scanner 12, various kinds of manipulative instructions, and screens on which various conditions are set and/or registered.

The scanner 12 is an apparatus for reading the image recorded on the film F or the like photoelectrically. It comprises an illuminant 22, a variable diaphragm 24, a diffuser box 28 with which the reading light incident on the film F is made uniform on the plane of the film F, an imaging lens unit 32, an image sensor 34 which has line CCD sensors corresponding to the reading of respective R (red), G (green) and B (blue) images, an amplifier 36 and an A/D (analog to digital) converter 38.

The photoprinter 10 has dedicated carriers which can be selectively mounted on the housing of the scanner 12 depending upon such factors as the type and size of films, for example, films for an Advanced Photo System and negative (or reversal) films of 135 size, the physical form of the films, e.g. whether they are a strip or a slide. By replacing carriers, the photoprinter 10 is capable of handling and processing various kinds of films. An image recorded on the film (or the frame thereof) is transported to a predetermined reading position by the carrier and is used for print creation.

In the scanner 12, when the image recorded on the film F is read, light emitted from the illuminant 22 is adjusted in quantity through the variable diaphragm 24, then is incident on the film F which is held at the predetermined reading position by a carrier, and passes therethrough to produce projected light which carries the image recorded on the film F.

As shown in FIG. 2A, the carrier 30 includes transport rollers pairs 30a and 30b, which are located on opposite sides of the predetermined reading position, and a mask 40 having a slit 40a. The mask 40 is located at a position corresponding to the reading position where the light projected from the film F is defined to a preset slit shape. The slit 40a extends in the direction (main scanning direction) in which the line CCD sensors extend, and the transport roller pairs 30a and 30b transport the film F with its lengthwise direction in agreement with an auxiliary scanning direction which is perpendicular the main scanning direction) while holding the film F at the predetermined reading position.

The film F is illuminated with the reading light, while being held at the reading position by the carrier 30 and transported in the auxiliary scanning direction. Consequently, the film F is subjected to two-dimensional slit scan with the reading light that passed through the slit 40a extending in the main scanning direction, whereupon the image recorded on each frame of the film F is read.

A magnetic recording medium is formed on a film for the Advanced Photo system, and the carrier 30 corresponding to the film (cartridge) of the Advanced Photo System includes magnetic heads 42 to record information on the magnetic recording medium and read recorded information therefrom. The information recorded on the magnetic recording medium of the film is read by the magnetic heads 42 and transmitted to the image processing apparatus 14 or the like. Further, the information from the image processing apparatus 14 or the like is transmitted to the carrier 30 and recorded on the magnetic recording medium of the film F by the magnetic heads 42.

The carrier 30 also includes a code reader 44 to read bar codes which are optically recorded on the film such as a DX code, expanded DX code, FNS code and the like and various kinds of information optically recorded thereon. The various kinds of information read by the code reader 44 is transmitted to the image processing apparatus 14 or the like.

As described above, the reading light passes through the film F held by the carrier 30 and is projected therefrom. The image-carrying projected light is processed with the imaging lens unit 32 and forms a focused image on the light receiving plane of the image sensor 34.

Figure 2B:
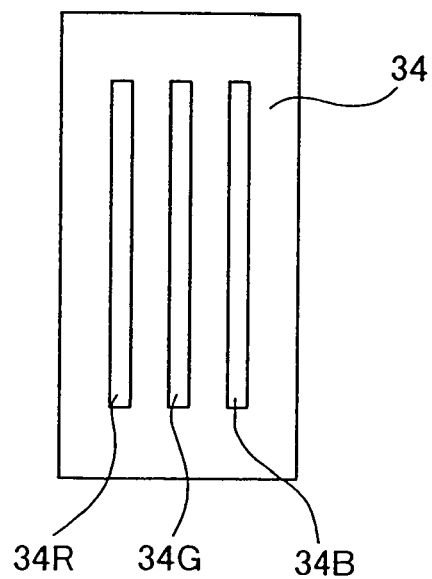
FIG. 2B shows a conceptual view of an image sensor in the digital photoprinter shown in FIG. 1.

As shown in FIG. 2B, the image sensor 34 is a so-called 3-line color CCD sensor comprising a line CCD sensor 34R for reading an R image, a line CCD sensor 34G for reading a G image, and a line CCD sensor 34B for reading a B image. The respective line CCD sensors extend in the main scanning direction. The light projected from the film F is separated into the three primary colors R, G and B by means of the image sensor 34 and read photoelectrically.

The output signals from the image sensor 34 are amplified by the amplifier 36, converted to digital signals by the A/D converter 38 and thereafter sent to the image processing apparatus 14.

The scanner 12 reads the image recorded on the film F twice. That is, the scanner 12 carries out prescan for reading the image at a low resolution and fine scan for obtaining the output data of an output image.

The prescan is carried out under prescan reading conditions which are set to read the images of the entire film F to be read by the scanner 12 so that the image sensor 34 can read the images as input images without being saturated. In contrast, the fine scan is carried out under fine scan reading conditions that are set from prescan data for each image (frame) so that the image sensor 34 is saturated at a slightly lower density than the minimum density of each image (frame). Therefore, the output signals in the prescan and the fine scan have different resolutions and output levels even in the same image.

It should be noted that the scanner in the present invention is by no means limited to a type that relies upon the slit scan described above but that it may make use of areal exposure by which the entire surface of the image in one frame is read at a time. In this case, for example, an area CCD sensor is used, a device for inserting R, G and B color filters is interposed between the illuminant 22 and the film F, and the image recorded on the film F is read with the area CCD sensor so as to separate the image to the three primary colors by sequentially inserting the respective color filters.

As described above, the output signals (image data) from the scanner 12 are supplied to the image processing apparatus 14 according to the present invention.

Note that the image processing apparatus 14 of the present invention may receive not only the images of the film F read with the scanner 12, but also image data from various kinds of image data supply sources such as various image reading apparatus for reading the images of a reflecting document, imaging devices such as a digital camera, a digital video camera, and the like, a communication network such as a LAN (Local Area Network), a computer communication network or the like, image data storing devices including media (recording media) such as a memory card, an MO disk (magneto-optical recording medium), a photo CD and the like, and subject the thus received image data to the following processing.

FIG. 3 shows a block diagram of the image processing apparatus 14. As shown in FIG. 3, the image processing apparatus 14 (hereinafter, simply referred to as "processing apparatus 14") comprises a data processing section 46, a Log converting section 48, a prescan (frame) memory 50, a fine scan (frame) memory 52, a prescan processing section 54, a fine scan processing section 56, and a condition setting section 58.

FIG. 3 mainly shows the sites which are related to image processing. In addition to the components shown in FIG. 3, the processing apparatus 14 includes a CPU which controls and manages the photoprinter 10 in its entirety including the processing apparatus 14, a memory which stores the information necessary for the operation of the photoprinter 10, a device for determining the aperture value of the variable diaphragm 24 and the storage time of the CCD sensor 34, and so forth. Further, the manipulating unit 18 and the display unit 20 are connected to the respective sections through the CPU and the like (CPU bus).

First, the, R, G and B signals, which are output from the scanner 12, are subjected to predetermined processing steps such as DC offset correction, darkness correction, shading correction and the like in the data processing section 46 and converted into digital image data by the Log converting section 48. Then, prescan (image) data is stored in the prescan memory 50 and the fine scan (image) data is stored in the fine scan memory 52, respectively.

The prescan data stored in the prescan memory 50 is processed with the prescan processing section 54 to produce image data corresponding to an image to be represented on the display unit 20, whereas the fine scan data stored in the fine scan memory 52 is processed with the fine scan processing section 56 to produce image data corresponding to an image to be output from the printer 16. The prescan processing section 54 includes an image processing subsection 62 and a signal converting subsection 64. On the other hand, the fine scan processing section 56 includes an image processing subsection 66 and a signal converting subsection 68.

The image processing subsection 62 (hereinafter, referred to as "processing subsection 62") of the prescan processing section 54 and the image processing subsection 66 (hereinafter, referred to as "processing subsection 66") of the fine scan processing section 56 subject the image (image data) read with the scanner 12 to image processing in accordance with the setting made in the condition setting section 58 which will be described later in detail. Both the processing subsections basically carry out the same processing except that the image data to be processed have different pixel densities.

The processing subsections 62 and 66 execute various kinds of known image processing steps including at least one of, for example, gray balance adjustment, gradation adjustment, density adjustment, electronic magnification processing, sharpness processing, graininess suppressing processing, dodging (provision of dodging effect in a direct exposure type photoprinter by the compression of image data performed while maintaining intermediate gradation), geometrical deformation correction, marginal luminosity correction, red-eye correction, special finishing such as soft focus finishing, monochrome finishing, and the like.

These processing steps may be performed by any known methods and can be executed by appropriate combinations of processing steps carried out with algorithm, an adder, a subtracter, a LUT (look-up table), matrix (MTX) operation, a filter, and the like.

As examples, the gray balance adjustment, the density adjustment and the gradation adjustment are performed by a method using a LUT which is constructed in accordance with image characteristic quantities and the saturation adjustment is carried out by a method using a MTX operation. Further, the sharpness processing is carried out in such a manner that an image is divided into frequency components, luminance signals obtained from intermediate and high frequency components are multiplied by a sharpness gain (sharpness correction coefficient) and resulting luminance information is added to a low frequency component.

The signal converting subsection 64 of the prescan processing section 54 is a site where the image data having been processed with the processing subsection 62 is converted by 3D (3-dimension)—LUT or the like, thereby producing image data corresponding to an image to be represented on the display unit 20.

In contrast, the signal converting subsection 68 of the fine scan processing section 56 is a site where the image data having been processed with the processing subsection 66 is converted with the 3D-LUT or the like into image data corresponding to an image to be recorded by the printer 16 to which the converted image data is supplied.

The processing conditions in both the converting subsections 64, 68 are set by the condition setting section 58.

The image processing steps carried out by the prescan processing section 54 and the fine scan processing section 56 and the processing conditions employed therein are set by the condition setting section 58.

The condition setting section 58 includes a set-up subsection 70, a key correcting subsection 74 and a parameter coordinating subsection 76. Further, an image-related information storing unit 78 (hereinafter, referred to as "storing unit 78") is connected to the parameter coordinating subsection 76 and a notifying unit 80 is connected to the storing unit 78.

It is ordinarily at the time when so-called simultaneous prints are created that image-related information is stored in the storing unit 78. Thus, the prints created at the time the image-related information is stored is referred to as "simultaneous prints" and prints that are created afterward are referred to as "reprints". The image-related information may of course be stored in the storing unit 78 during the previous reprinting to be used in the subsequent reprinting. That is, in the present invention, the image-related information is stored in the storing unit 78 during the previous printing such as simultaneous printing or previous reprinting, and is used during the subsequent printing such as first reprinting or subsequent reprinting. The following description is however directed to the case where simultaneous printing precedes reprinting.

The set-up subsection 70 determines the reading conditions for fine scan, the contents and conditions for image processing in the prescan processing section 54 and the fine scan processing section 56, and the like.

Specifically, when the simultaneous prints are created, the set-up subsection 70 constructs density histograms and calculates image characteristic quantities such as average density, specified % point value in frequency of the density histograms such as highlight (minimum density), shadow (maximum density) and the like, LATD (large area transmission density), maximum and minimum density values of the histograms, and the like. Then, the set-up subsection 70 sets the reading conditions for fine scan as described above, determines the image adjustment steps and the sequence of the steps to be executed from the various kinds of image processing steps in accordance with the density histograms, the image characteristic quantities, instructions from an operator and the like, and further calculates respective image processing conditions as well as the conversion conditions in the signal converting subsection 68 and the like and supplies them to the parameter coordinating subsection 76.

On the other hand, when the reprints are created, the set-up subsection 70 constructs density histograms and calculates image characteristic quantities as in the case of the simultaneous prints, thereby setting the reading conditions for fine scan. In addition, the set-up subsection 70 basically uses the image-related information of the frames to be reprinted that the parameter coordinating subsection 76 read out of the storing unit 78 to thereby reproduce the processing in simultaneous printing executed by the fine scan processing section 56. The thus reproduced processing is supplied to the parameter coordinating subsection 76.

Note that when the print conditions and the like in the simultaneous print are different from those in the reprint, the image processing conditions and the like in the reprint may be altered as necessary. For example, when conditions relating to an image structure is different such as when a print size and a resolution are different, processing conditions for image adjustment which relate to the image structure, for example, the parameters and the like of the sharpness processing, the graininess suppressing processing and the like are altered accordingly.

Further, irrespective of whether the print is a simultaneous print or a reprint, the set-up subsection 70 is not limited to the case where the processing conditions are calculated only from the image data of the frames for which prints are created, and it may set the processing conditions using not only the image data of the frames of interest, but also, for example, the image data of all frames of a film and the image data of a plurality of frames processed previously.

The key correcting subsection 74 calculates the amounts of adjustment of the image processing conditions in accordance with the instructions for color adjustment, density adjustment, contrast (gradation) adjustment and the like which are input with the keyboard 18a and the mouse 18b of the manipulating unit 18 and supplies them to the parameter coordinating subsection 76.

The parameter coordinating subsection 76 receives the image processing conditions and the like calculated by the set-up subsection 70, sets them to the predetermined sites of the prescan processing section 54 and the fine scan processing section 56, and further adjusts the image processing conditions set to the respective sites in accordance with the amounts of adjustment calculated by the key correcting subsection 74 and the like.

Further, in the simultaneous print, after processing for a frame of interest is finalized, the parameter coordinating subsection 76 sends the image-related information of the frame to the storing unit 78. Then, in the reprint, the parameter coordinating subsection 76 searches the storing unit 78 and reads the image-related information of the frame for which a reprint is created and displays the result of the search on the display unit 20 and further supplies necessary information to predetermined sites such as the set-up subsection 70 and the like. The above point will be described later in detail.

As described above, the storing unit 78 is connected to the set-up subsection 70 to store the image-related information of the frame (the frame processed with the processing apparatus 14) for which a print was created previously.

Further, the notifying unit 80 is connected to the storing unit 78 to notify that the capacity of the storing unit 78 is insufficient to store additional new image-related information. The notifying unit 80 will be described later in detail.

In the present invention, the image-related information (image-related information data) is, for example, information for searching or specifying a frame (image) of interest (hereinafter, referred to as "search information") and at least one of the information of the processing applied to the frame (image) and the image data of the frame.

The search information is information for identifying or specifying the frame of interest, and includes, for example, film information for identifying the film F and frame ID information such as a frame number and the like.

Exemplified as the frame ID information are the identification information of the film F such as a type and manufacturer of the film, and the like, bar codes recorded on the film F such as a DX code and the like, customer identifying information, the identifying information of the photoprinter 10, the date on which a print is created or on which image processing is carried out, a frame number, various kinds of information on a back print, and the like. Since the film F of the Advanced Photo System has an ID number allocated to each cartridge, it can be used. The ID number and the frame member are magnetically recorded on the film F and also written on the cartridge and an index print.

The search information only need be supplied to the parameter coordinating subsection 76 by inputting it through the keyboard 18a or the mouse 18b or by reading the barcode, the magnetic information and the like with the scanner 30 when simultaneous prints or reprints are created.

In the present invention, the frame search information is not limited to the frame ID information and various kinds of information may be used.

Preferably used as the search information are, for example, the image characteristic values of the image of the frame, specifically the image characteristic quantities calculated by the set-up subsection 70 and the information of density histograms, the image characteristic quantities of respective blocks when an image is divided into the blocks and the information of the density histograms of the blocked images, a low resolution image such as a thinned-out image, a thumb nail image, and the like.

The search information only need be calculated in the set-up subsection 70 for example, from the image data obtained by prescan or fine scan image reading when simultaneous prints or reprints are created and supplied to the parameter coordinating subsection 76.

Further, the compressed image (compressed image data) of the frame of interest also can be preferably used as the search information. A method of image compression is not particularly limited. Although various kinds of known image compression methods such as Flash Pix, JPEG and the like can be used, the following method is exemplified as a preferable method.

In the compression method, first, a prescanned image is thinned out and index images of, for example, 72×48 pixels is created and preferably set up so that the average values of the thus created index images are made equal to each other.

Then, the index images are converted from R, G and B image data into Y, Columnar body, y and Cr image data (YCC images) by a known method.

Each of the thus created YCC images is divided into a plurality of blocks. When, for example, the size (number of pixels) of one block is 8×8 pixels, the index image is divided into 9×6 blocks in the above 72×48 pixels.

Subsequently, the pixels f (x, y) of each block is subjected to DCT (discrete cosine transformation) and the space frequency F (u, v) of the YCC image is determined and used as a compressed image.

$$F(u,v) = \frac{1}{4} * C(u)C(v)[\Sigma\Sigma f(x,y)\cos((2x+1)u\pi/16)\cos((2y+1)v\pi/16)]$$

The two summation symbols $\Sigma$ in the above formula are applied to x and y, respectively, wherein x=0 to 7 and Y=0 to 7. Further, when z=0, $C(z)=1(2^{1/2})$.

When the image characteristic quantities and the compressed image as described above are used as the search information, the same information of one or a plurality of frames which were processed prior to the frame of interest also may be used as the search information. The search accuracy of image-related information can be thus enhanced.

The search information is described in detail in the specification of commonly assigned Japanese Patent Application No. 10-152783 and the image compression method is described in detail in the specification of commonly assigned Japanese Patent Application No. 10-333602.

Processing information as the image-related information is for reproducing the processing of the same image (image data) as that used in the simultaneous print, and the information includes the contents of image processing such as a type of applied image processing, a sequence of image processing steps, image processing conditions of each image processing step (including parameters and relating data), and the like.

The image processing conditions may be any information so long as it can reproduce the image processing conditions in the simultaneous print, and specifically exemplified as the image processing conditions are a LUT and an arithmetic operation formula created for image processing, a predetermined coefficient applied to image processing, and the like. For example, storing a LUT, a MTX operation formula and a coefficient suffices for the image processing such as the gray balance adjustment and the like which is processed by the LUT, the image processing such as the saturation correction which is processed by the MTX operation and the processing such as the sharpness processing which is set by the coefficient (gain), respectively.

Further, the image data processed with the fine scan processing section 56, the compressed image thereof and the like also can be used as the image-related information in place of the image data processing information.

Note that they also can be used as the search information.

The storing unit 78 for storing the image-related information is not particularly limited and various kinds of devices can be used.

For example, a hard disc or database built in or connected to the processing apparatus 14 and various types of recording media such as a floppy disc, a magneto-optic recording medium and the like are exemplified as the storing unit 78. Further, the photoprinter 10 may be connected to external database through a communication system such as a computer communication network or the like. The magnetic recording medium formed on a film of the Advanced Photo System may be used, if it allows for capacity. Otherwise, an IC memory may be mounted on a cartridge or a Patrone and used as the storing unit 78.

When the recording medium is used as the storing unit 78, it may be managed by a laboratory or delivered to a customer when simultaneous prints are created so that the customer can present it to the laboratory upon request for reprints.

As described above, the image data processed with the prescan processing section 54 of the processing apparatus 14 is sent to the display unit 20 and the image data processed with the fine scan processing section 56 is sent to the printer 16, respectively.

The printer 16 includes a printer (exposing device) for exposing a light-sensitive material (photographic paper) in accordance with the supplied image data to record a latent image thereon and a processor (development device) for subjecting the exposed light-sensitive material to predetermined processing and outputting it as a print.

In the printer 16, after a light-sensitive material is for example cut to a print length, a back print is recorded thereon. Then, three kinds of light beams for R, G and B exposures are modulated in accordance with the image data output from the processing apparatus 14 and deflected in the main scanning direction as well as the light-sensitive material is transported in the auxiliary scanning direction perpendicular to the main scanning direction, whereby the light-sensitive material is two-dimensionally scanned and exposed and sent to the processor after the latent image is recorded thereon. The processor having received the light-sensitive material carries out predetermined wet-type development processing such as color development, bleach-fix, rinsing and the like, and drying to produce prints. Then, the prints are sorted and stacked in a predetermined unit such as one film or the like.

The image processing apparatus of the present invention will be described below in more detail by explaining the operation of the photoprinter 10.

First, a case of simultaneous printing will be described.

In the simultaneous printing, an operator who creates prints from the film F, mounts a carrier adapted for the film F at a predetermined position of the scanner 12, sets the film F to the carrier, and instructs to start print creation after he or she inputs the size of the prints to be created and other various kinds of information set as the image-related information, or inputs necessary instruction, selection or setting.

With this operation, the aperture value of the variable diaphragm 24 of the scanner 12 and the like are set in accordance with the reading conditions for prescan. Thereafter, the carrier 30 transports the film F in the auxiliary scan direction at a prescan speed. Thus, the film F is slit scanned at a predetermined reading position as described above and projected light forms a focused image on the image sensor 34 so that the image recorded on the film F is decomposed to R, G and B and photoelectrically read.

Further, when the film F is transported by the carrier 30, the DX code and the magnetic information recorded on the film F are read and sent to various sections of the processing apparatus 14.

Among the information obtained by the above manipulation, the information set as the image-related information is sent to the parameter coordinating subsection 76.

Note that the prescan and the fine scan may be carried out for each frame or may be continuously carried out for all the frames or for each predetermined number of frames. Alternatively, the prescan may be continuously carried out for all the frames or for each predetermined number of frames, whereas the fine scan for each frame or for each predetermined less number of frames than that in the prescan. For the sake of simplification, the following typical example is directed to the case where prescan and fine scan are performed for each frame.

The output from the image sensor 34 is amplified with the amplifier 36 and converted into a digital signal by the A/D converter 38. Then, the digital signal is sent to the processing apparatus 14 and subjected to predetermined processing such as offset correction and the like in the data processing section 46. Thereafter, the thus processed signal is converted into digital image data by the Log converting section 48 and stored in the prescan memory 50.

When the prescanned data is stored in the prescan memory 50, the set-up subsection 70 reads out it and creates density histograms and calculates image characteristic quantities, as mentioned above. Based on the results obtained, the set-up subsection 70 sets the reading conditions for fine scan such as the aperture value of the variable diaphragm 24 and the like. The thus set conditions are supplied to the scanner 12.

The set-up subsection 70 further selects image processing steps to be executed in the frame (image) of interest in accordance with the density histograms, the image characteristic quantities and the instructions from the operator, determines the sequence of the image processing steps to be executed and calculates the image processing conditions (signal conversion conditions) of the respective image processing steps. The thus set image processing conditions are sent to the parameter coordinating subsection 76 and set to the predetermined locations (hardware) of the prescan processing section 54 and the fine scan processing section 56.

The image characteristic quantities and the like which are set as the image-related information are sent to the parameter coordinating subsection 76.

When the image processing conditions are set to the prescan processing section 54 in the execution of a qualification, prescan data is read from the prescan memory 50 and subjected to image processing in accordance with the image processing conditions set in the processing subsection 62. Then, the resultant prescan data is supplied to the signal converting subsection 64 and converted into display image data adapted for the representation on the display unit 20 so that a prescanned image is represented on the display unit 20 as a simulation image.

The operator confirms (qualifies) the image while looking at the image on the display unit 20 and adjusts color, density, gradation and the like using the adjustment keys set on the keyboard 18a and the like when necessary.

Adjustment signals are sent to the key correcting subsection 74. The key correcting subsection 74 calculates an amount of correction of the image processing conditions in accordance with the input thereto and sends it to the parameter coordinating subsection 76. The parameter coordinating subsection 76 corrects the image processing conditions set to the processing subsections 62 and 66 in accordance with the amount of correction sent thereto. Therefore, the image represented on the display unit 20 also changes in accordance with the input by the operator.

When the operator determines that the image represented on the display unit 20 is proper (qualification: OK), he or she indicates that the image is proper using the keyboard 18a or the like.

With this operation, the processing of the image data is finalized and fine scan is started. That is, the reading conditions for fine scan, in which the aperture value of the variable diaphragm 24, and the like are set by the scanner 12, are set as well as the carrier 30 transports the film F at a fine scan speed.

Note that when the qualification is not carried out, the processing is finalized at the time the image processing conditions have been set to the fine scan processing section 56 by the parameter coordinating subsection 76 and then the fine scan is started. It is preferable whether the qualification is to be carried out or not can be selected as a mode.

The fine scan is carried out similarly to the prescan except that the reading conditions set for the fine scan are employed. The output signal from the image sensor 34 is processed by the amplifier 36 and the A/D converter 38, further processed by the data processing section 46 of the processing apparatus 14, and converted in the Log converting section 48 into fine scan data, which is sent to the fine scan memory 52.

When the fine scan data is sent to the fine scan memory 52, it is read by the fine scan processing section 56 and subjected to image processing under the finalized image processing conditions in the processing subsection 66. Then, the resultant fine scan data is converted in the signal converting subsection 68 into output image data, which is output to the printer 16, where a print on which the image data is reproduced is created.

On the other hand, when the set image-related information is entirely available, the parameter coordinating subsection 76 uses it as the image-related information of a frame of interest and supplies at a predetermined timing the size of the image-related information and the image-related information to the notifying unit 80 and the storing unit 78, respectively. How the image-related information is supplied to the storing unit 78 will be described later in detail.

Note that when a compressed image and the like are used as the image-related information, the image may be compressed in the corresponding sites that the illustrated processing apparatus 14 has, as exemplified by the set-up subsection 70, the parameter coordinating subsection 76 or the like. Otherwise, an image compressing section may be independently provided.

Further, an upper limit may be set for the size (data size) of the image-related information, and when the size exceeds the upper limit, the information may be deleted from, for example, the one of lower importance. The upper size limit of the image-related information may be made variable so that it can be appropriately set.

In the print system to which the image processing apparatus of the present invention is applied, the timing at which the image-related information is stored in the storing unit 78 is not limited to the time the simultaneous printing is carried out. Thus, when a customer complaining about the images on simultaneous prints requests reprinting with the instruction for color and density processing or when a print of a frame whose image processing information is not stored is to be created, the image processing information and the like to be used may be stored as the image-related information.

In contrast, in the photoprinter 10, reprinting is basically performed as described below.

When the operator is requested to create reprints for a film F, he or she mounts a carrier 30 adapted for the film F on the scanner 12 and loads the film F in the carrier 30. Then, necessary information including input information to indicate reprinting, print conditions such as a frame for which a reprint is to be created, a print size and the like, image-related information having been set, and the like is input using the keyboard 78a or the like, and print start is instructed.

With this operation, the carrier 30 transports the film F so that the frame for which the reprint is to be created is located at a reading position, prescan is started, and necessary information is sent to the parameter coordinating subsection 76 and the like.

The prescan is performed as in simultaneous printing. That is, under the prescan reading conditions, the projected light from the film F forms a focused image on the image sensor 34 and an output signal is amplified by the amplifier 36 and converted into a digital signal by the A/D converter 38. The digital signal is processed in the data processing section 46 and the Log converting section 48 to produce prescan data, which is stored in the prescan memory 50.

Then, in the embodiment under consideration, the prescanned image of the frame for which the reprint is to be created is preferably represented on the display unit 20 in the same manner as in simultaneous printing. Note that the prescanned image need not be subjected to image processing at the time.

Further, when the film F is transported, the information such as a DX code and the like which is recorded on the film F is read with the carrier 30 as in simultaneous printing and necessary information such as image-related information and the like is sent to the parameter coordinating subsection 76 and the like.

When necessary information is available, the parameter coordinating subsection 76 searches the storing unit 78 using the image-related information (search information), selects a frame which is assumed to the same as the frame for which the reprint is to be created (candidate frame), and reads the image-related information thereof. Necessary information is then supplied to t he signal converting subsection 64 and displayed.

When information (image data) capable of image display as in a compressed image, a thinned-out image, a low resolution image and the like, is stored as the image-related information, the image of a candidate frame can be displayed after necessary processing such as decompression and the like is performed. Whereas, when the image-related information is other than the above information, information from which the operator can identify the frame of interest is displayed such as a date of simultaneous printing, a customer's name, a frame number, a film type and the like.

Since the prescanned image of the frame for which the reprint is to be created is represented on the display unit 20 in the embodiment under consideration, it is preferable to display the candidate frame adjacently.

A candidate frame may be used, but a plurality of frames may be selected as candidates to be displayed in the order of candidates having higher possibility for frame identicalness. When a search is performed with a high accuracy, it is preferable to select one frame or a few frames. Further, the number of frames to be selected as candidates may be suitably set.

When a plurality of frames are selected as candidates, all the frames may be displayed at the same time or one or some frames may be sequentially displayed in the order of more desired candidates by the manipulation of the operator.

The operator selects or specifies the same frame as the frame for which the reprint is to be created from the searched frames while looking at the representation on the display unit 20 and instructs the selected or specified frame. When the same frame as the frame for which the reprint is to be created is not represented, the search is not properly performed. Thus, the operator instructs it.

The above instructions are input to the parameter coordinating subsection 76.

When the reprint is created from the film F of the Advanced Photo System and the ID number and the frame number are used as image-related information, if the image-related information of the frame is already stored in the storing unit 78, the image-related information of the frame for which the reprint is to be created can be substantially reliably read out by searching. Accordingly, the candidate frames need not be ranked or displayed.

Further, different image-related information (in particular, search information) may be used for the film F of the Advanced Photo System and an ordinary film such as a film of 135 size and the like.

When the same frame as the frame for which the reprint is to be created is instructed from the searched frames (search is properly performed), the parameter coordinating subsection 76 supplies necessary information, for example, image processing information selected from the image-related information of the frame to the set-up subsection 70.

On the other hand, the set-up subsection 70 constructs density histograms and calculates image characteristic quantities from the prescan data in the same manner as in simultaneous printing, sets the reading conditions for fine scan and supplies them to the scanner 12. Further, the set-up subsection 70 sets processing steps from the calculated image characteristic quantities and the like, and the image-related information sent from the parameter coordinating subsection 76 so that the image data processing steps performed by the fine scan processing section 56 in simultaneous printing can be reproduced, that is, so that the same image processing steps (including the processing step in the signal converting subsection 68) can be carried out under the same conditions in the same order. Then, the set-up subsection 70 supplies the processing steps to the parameter coordinating subsection 76.

The parameter coordinating subsection 76 sets the image processing conditions and the like supplied thereto at a predetermined location of the fine scan processing section 56.

When the search is properly performed in reprinting, the image data processing is finalized by setting the image processing conditions to the fine scan processing section 56 and the fine scan is started. Otherwise, it is needless to say that qualification may be carried out as in simultaneous printing when necessary.

On the other hand, when the search is improperly carried out, image processing and the like are carried out as in simultaneous printing.

That is, the parameter coordinating subsection 76 instructs to the set-up subsection 70 that image processing is to be carried out as in simultaneous printing. The set-up subsection 70 sets the reading conditions for fine scan as in simultaneous printing, sets the processing contents from the prescan data, and supplies them to the parameter coordinating subsection 76. When the image processing conditions and the like are set to the prescan processing section 54 by the parameter coordinating subsection 76, the prescanned image is represented on the display unit 20, and the qualification is carried out. The processing steps are finalized when the qualification is OK, and the fine scan is started.

The fine scan is performed basically in the same manner as in simultaneous printing. That is, in the scanner 12, under the supplied reading conditions for fine scan, the output signal from the image sensor 34 is amplified with the amplifier 36 and converted into a digital signal by the A/D converter 38. Then, the digital signal is processed by the data processing section 46 of the processing apparatus 14, and converted in the Log converting section 48 into fine scan data, which is sent to the fine scan memory 52 and stored therein.

Subsequently, the fine scan data is read from the fine scan memory 52, processed under the processing conditions set by the processing subsection 66, converted into output image data by the signal converting subsection 68 and output to the printer 16, whereby a print on which the output image data is reproduced, is output.

Note that when the image data having been processed by the fine scan processing section 56 and the compressed image of the image data (when it is reversible) are stored as the image-related information in the present invention, if the search is properly carried out, a reprint may be created using the image data stored as the image-related information and decomposed image data, without performing the fine scan.

The image reproduced on the reprint when the search has been properly carried out is basically an image which has been subjected to the same image data processing as that of the simultaneous print under the same processing conditions as those of the simultaneous print. Therefore, the color and the density of the image of the reprint are preferably in agreement with those of the image of the simultaneous print.

As described above, in the photoprinter 10 making use of the present invention, when the simultaneous print and the like are created, the image-related information of respective frames is transferred from the parameter coordinating subsection 76 to the storing unit 78 and stored therein.

The image-related information may be transferred to the storing unit 78 for each frame or for each case such as one film or the like. However, since the storage capacity of the storing unit 78 is limited, when the stored amount of the image-related information is increased, the capacity will be saturated soon.

In the photoprinter 10 of the illustrated case, when the image-related information is transferred, the notifying unit 80 detects the remaining storage capacity of the storing unit 78. Thus, when the storage capacity of the storing unit 78 is not sufficient to store new image-related information, the notifying unit 80 notifies it.

Specifically, the parameter coordinating subsection 76 sends to the notifying unit 80 the size data of the image-related information to be transferred to the storing unit 78 before it is transferred thereto. The notifying unit 80 detects the remaining storage capacity of the storing unit 78 based on the received data. When the next image-related information to be transferred to the storing unit 78 has a size to exceed the storage capacity of the storing unit 78, the notifying unit 80 issues an alarm or represents on the display unit 20 to notify that the amount of the image-related information exceeds the storage capacity of the storing unit 78.

Subsequently, in the photoprinter 10 making use of the image processing apparatus of the present invention, it is preferred that the storing unit 78, for example, automatically deletes a predetermined amount of the image-related information stored in the storing unit 78 from the older one thereof. Note that the predetermined amount is not particularly limited and a predetermined number of cases, a predetermined number of frames, a predetermined period of time (a number of dates on which simultaneous printing was carried out) are exemplified.

Further in the present invention, the storing unit 78 may not simply delete a predetermined amount of the stored image-related information from the older one, but move to other storing devices.

Further, in the image processing apparatus of the present invention, when the notifying unit 80 notifies that the storage capacity of the storing unit 78 will be full, the image-related information may not be automatically deleted or moved, but selectively deleted or moved by the operator.

For example, a list of the image-related information stored in the storing unit 78 is displayed, for example, entirely, in the order of older one, or by being classified to respective customers in response to the notification from the notifying unit 80, and the operator selects and instructs image-related information to be deleted or moved in terms of a number of cases (number of frames), a period of time, customers and the like.

It is preferable that the automatic deletion or movement, and the selective deletion or movement of the image-related information can be selected.

Therefore, according to the image processing apparatus of the present invention, it can be prevented that the amount of the image-related information carelessly exceeds the storage capacity of the storing unit 78 and important image-related information is lost, whereby a reprint which is in agreement with a simultaneous print can be stably output.

Further, it is preferable that the capacity of the storing unit 78 (image-related information recording region) can be appropriately set.

In another embodiment of the image processing apparatus of the present invention, the image-related information is stored in the storing unit 78 which is divided into two regions, that is, a processing region and a storing region.

The processing region is a region where a predetermined unit of image-related information previously set is stored, and the image-related information from the parameter coordinating subsection 76 is first transferred to the processing region. Note that the image-related information may be transferred from the parameter coordinating subsection 76 for each frame or for each plurality of frames.

When the predetermined unit of image-related information is stored in the processing region, it is transferred to the storing region.

The predetermined unit of image-related information is a quantitative or temporal unit of image-related information which is previously determined. For example, the unites concerning the time or data volume including a predetermined number of frames, a predetermined number of cases such as one case, a plurality of cases and the like, a number of frames (cases) processed in a predetermined time, a number of frames (cases) processed in the forenoon, a number of frames (cases) processed in the afternoon, a number of frames (cases) processed in a day are exemplified.

In addition, it is preferable that the predetermined units can be optionally switched, and further it is preferable that values can be selected and set for the predetermined units expressed numerically as the number of frames, the number of cases, the period of time and the like.

In the embodiment under consideration, the image-related information sent from the parameter coordinating subsection 76 is first stored in the processing region until it is arranged as a predetermined unit of image-related information as described above. Note that, in this embodiment, the amount processed in a day is set as the predetermined unit.

When prints to be created in a day have been finished, that is, when a job has been finished, the operator notifies it. The image-related information stored in the processing region is transferred to the storing region in the storing unit 78 in response to the notification. At the time, the notifying unit 80 detects the size of the image-related information stored in the processing region and the remaining storage capacity of the storing region. Then, when the next image-related information to be transferred from the processing region has a size to exceed the storage capacity of the storing region, the notifying unit 80 issues an alarm or represents on the display unit 20 to notify that the amount of the image-related information exceeds the storage capacity of the storing unit 78.

When the notifying unit 80 notifies that the storage capacity of the storing unit 78 will be full, the storing unit 78, for example, automatically deletes a predetermined amount of the stored image-related information from the older one or moves it to other storing devices. Otherwise, the operator selectively deletes or moves the stored image-related information in place of automatically deleting or moving it.

Both of the methods may be selectable.

In addition to the advantage of the previous embodiment, this embodiment has another advantage that when it is estimated that the storage capacity of the storing region will be full, the notifying unit 80 notifies at a predetermined timing. Therefore, the operator is not encountered with the sudden interruption of a job, whereby workability can be more enhanced.

Further, as to the frames processed on that day, the image-related information thereof can be obtained again because the film F remains at hand of the operator. However, as to the frames processed the previous day or the like, the image-related information thereof is important because the film is not at hand of the operator. When the frequency with which the storing unit 78 is accessed is increased, possibility of data breakage is increased. According to this embodiment, however, since the frequency of access is increased in the processing region where the image-related information having been processed recently including the date of processing is stored, even if the data in the processing region is broken, the image-related information of the frames which were processed in the past including the previous day and stored in the storage region is not broken. Therefore, the job can be more stably and safely carried out.

Note that in the embodiment under consideration, the processing region and the storing region need not always exist in the same storing unit 78. For example, the processing region may be disposed in the parameter coordinating subsection 76 and the image-related information of the respective frames may be stored therein and each predetermined unit of image-related information may be transferred to the storing region and stored therein.

Further, it is preferable that the capacities and the like can be appropriately set for the processing region and the storing region, and the total region thereof.

In the image processing apparatus of the present invention, the output image data may be output not only to the printer 16 but also to various kinds of recording media such as a floppy disc, a MO disc (magnetic recording disc), a CD-R, and the like, to create an image file.

Further, the image processing apparatus of the present invention can be preferably used in the ordinary direct exposure type photoprinter, in addition to the digital photoprinter shown in FIG. 1.

As is well known, the direct exposure type photoprinter also photoelectrically reads an image recorded on a film at low resolution with an image sensor or the like to obtain image data, which is used to calculate image processing conditions, that is, an amount of insertion of a color filter and an aperture value upon printing on a photographic paper and the projected light from the film is adjusted in accordance with the thus calculated image processing conditions (which corresponds to image processing with digital exposure).

When the present invention is used in the direct exposure type photoprinter, if, for example, the amount of insertion of the color filter and the like are stored as the processing information of image-related information, a simultaneous print can be also advantageously made in agreement with a reprint.

While the image processing apparatus of the present invention has been described above in detail, the present invention is by no means limited to the above embodiments and it goes without saying that various improvements and modifications can be made within the range which does not depart from the gist of the invention.

For example, while the illustrated apparatus displays the result of search when a reprint is created as well as notifies the insufficient storage capacity of the storing unit, the present invention is by no means limited thereto and any one of them may be carried out.

As described above in detail, according to the present invention, a reprint, on which an image whose color and density are preferably in agreement with those of the image reproduced on a simultaneous print is reproduced, can be stably output with a simple manipulation.

Further, according to the present invention, the capacity of the storing unit for storing the image-related information which is necessary to the agreement of the image of the simultaneous print with that of the reprint can be stably and safely managed with excellent workability.

What is claimed is:

1. An image processing apparatus, comprising:
    an image processing unit for performing image processing on an input image to produce an output image;
    a storing unit for respectively storing image-related information relating to at least one image processed by said image processing unit;
    a notification unit for notifying that said storing unit does not have a sufficient capacity to store said image-related information, when said image-related information has such an amount as to exceed the capacity of said storing unit;
    a modification unit for performing, in response to a notification made by said notification unit to inform that said storing unit does not have a sufficient capacity to store said image-related information, at least one of deleting the image-related information stored in said storing unit from older one, moving the image-related information to another storing device from older one, and selecting the image-related information to be deleted.

2. The image processing apparatus according to claim 1, wherein said storing unit has a processing region for storing said image-related information relating to a predetermined unit of images having been previously set and a storing region for storing the image-related information of an image which is processed prior to an image whose image-related information is stored in said processing region and the image-related information stored in said processing region is transferred to said storing region after said image processing of the predetermined unit of the images is finished;
    said notification unit notifies that said storing region of said storing unit does not have a sufficient capacity to store said image-related information, when said image-related information has such an amount as to exceed the capacity of said storing region; and
    said modification unit performs, in response to a notification made by said notification unit to inform that said storing region of said storing unit does not have a sufficient capacity to store said image-related information, at least one of deleting the image-related information stored in said storing region from older one, moving the image-related information to another storing device, and selecting the image-related information to be deleted.

3. The image processing apparatus according to claim 2, wherein said predetermined unit is a unit in terms of time or data volume.

* * * * *